United States Patent
Lin et al.

(10) Patent No.: US 10,496,181 B2
(45) Date of Patent: Dec. 3, 2019

(54) GESTURE INPUT DEVICE

(71) Applicant: Acer Incorporated, New Taipei (TW)

(72) Inventors: Jia-Yu Lin, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/012,765

(22) Filed: Jun. 20, 2018

(65) Prior Publication Data

US 2019/0317607 A1    Oct. 17, 2019

(30) Foreign Application Priority Data

Apr. 17, 2018 (TW) .............................. 107112950 A

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01)

(58) Field of Classification Search
CPC .......... G06F 1/163; G06F 3/011; G06F 3/014; G06F 3/017; G06F 3/0346
See application file for complete search history.

(56) References Cited

U.S. PATENT DOCUMENTS

| 4,414,537 | A | 11/1983 | Grimes |
| 7,862,522 | B1 | 1/2011 | Barclay et al. |
| 9,342,151 | B2 | 5/2016 | Gu |
| 2016/0246369 | A1* | 8/2016 | Osman .................. A63F 13/212 |

OTHER PUBLICATIONS

Fahn et al. (Development of a Data Glove with Reducing Sensors Based on Magnetic Induction, IEEE Transactions on Industrial Electronics, vol. 52, No. 2, Apr. 2005 (Year: 2005).*

* cited by examiner

*Primary Examiner* — Stacy Khoo
(74) *Attorney, Agent, or Firm* — JCIPRNET

(57) ABSTRACT

A gesture input device for interacting with a wearable object is provided. A plurality of magnetic generators are disposed on the wearable object. The gesture input device includes a plurality of magnetic sensors and a controller. The magnetic sensors are disposed on the wearable object. The magnetic sensors are configured to sense a plurality of magnetic signals provided by the magnetic generators, and generate a plurality of voltage signals according to the magnetic signals. The controller is coupled to the magnetic sensors and configured to receive the voltage signals. When the wearable object is worn on a user's hand and the user's hand is in different gestures, the voltage signals generated by the magnetic sensors correspondingly change. The controller determines that the gesture of the user's hand according to the voltage signals.

19 Claims, 9 Drawing Sheets

GESTURE INPUT DEVICE

CROSS-REFERENCE TO RELATED APPLICATION

This application claims the priority benefit of Taiwan application serial no. 107112950, filed on Apr. 17, 2018. The entirety of the above-mentioned patent application is hereby incorporated by reference herein and made a part of this specification.

BACKGROUND OF THE DISCLOSURE

Field of the Disclosure

The disclosure relates to an input device, and particularly relates to a gesture input device.

Description of Related Art

Existing input devices, such as keyboards, mice or game joysticks, may only provide simple input functions of clicking and selection. In Virtual Reality (VR), Augmented Reality (AR) or related applications of a flat panel display with an interactive function, in order to strengthen the user experience and immersion, more and more input devices have been designed in various types and provide more functions. It is one of the most important development directions of the technical field to enable users to virtually manipulate a virtual object in a virtual environment through a virtual interface, manipulate the content displayed in a display device in a non-contact manner, and perform more quasi-realistic operations in the virtual environment.

SUMMARY OF THE DISCLOSURE

The disclosure is directed to a gesture input device, which is adapted to effectively detect a gesture of a user, so as to provide corresponding gesture information.

The disclosure provides a gesture input device configured to interact with a wearable object. A plurality of magnetic generators are disposed on the wearable object. The gesture input device includes a plurality of magnetic sensors and a controller. The magnetic sensors are disposed on the wearable object. The magnetic sensors are configured to sense a plurality of magnetic signals provided by the magnetic generators. The magnetic sensors generate a plurality of voltage signals according to the magnetic signals. The controller is coupled to the magnetic sensors, and is configured to receive the voltage signals. When the wearable object is worn on a user's hand, the magnetic generators and the magnetic sensors are respectively located at two sides of a plurality of joints of the user's hand. When a change of a gesture of the user's hand results in different relative positions of the magnetic generators and the magnetic sensors, at least one of the voltage signals generated by the magnetic sensors is correspondingly changed. The controller determines that the gesture of the user's hand according to the voltage signals.

The disclosure provides a gesture input device configured to interact with a handheld object. A plurality of magnetic generators are disposed on a holding portion of the handheld object. The gesture input device includes a plurality of magnetic sensors and a controller. The magnetic sensors are disposed on a wearable object. The magnetic sensors are configured to sense a plurality of magnetic signals provided by the magnetic generators. The magnetic sensors generate a plurality of voltage signals according to the magnetic signals. When the wearable object is worn on a user's hand, the magnetic sensors are respectively located at a palm of the user's hand. When the user's hand of the user holds the holding portion of the handheld object, the magnetic sensors sense the magnetic signals provided by the magnetic generators and at least one of the voltage signals generated by the magnetic sensors is correspondingly changed. The controller determines a manner that the user's hand holds the handheld object according to a pairing result between the magnetic sensors and the magnetic generators which is derived from the voltage signals generated by the magnetic sensors.

Based on the above description, the gesture input device of the disclosure is adapted to sense a plurality of magnetic signals provided by a plurality of magnetic generators through a plurality of magnetic sensors disposed on the wearable object worn by the user. When the user changes the relative positions between the magnetic sensors and the magnetic generators through a change of a gesture operation, the magnetic field strengths of the magnetic signals are correspondingly changed. Moreover, the gesture input device of the disclosure is also adapted to sense a plurality of magnetic signals provided by a plurality of magnetic generators disposed on the handheld object through a plurality of magnetic sensors disposed on the wearable object worn by the user. When the user holds the handheld object in different manners through the wearable object, the magnetic signals are correspondingly changed. Therefore, the gesture input device of the disclosure may interact with objects with magnetic generators and effectively provide corresponding the gesture information or the information that the user holds the handheld object according to the voltage signals.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
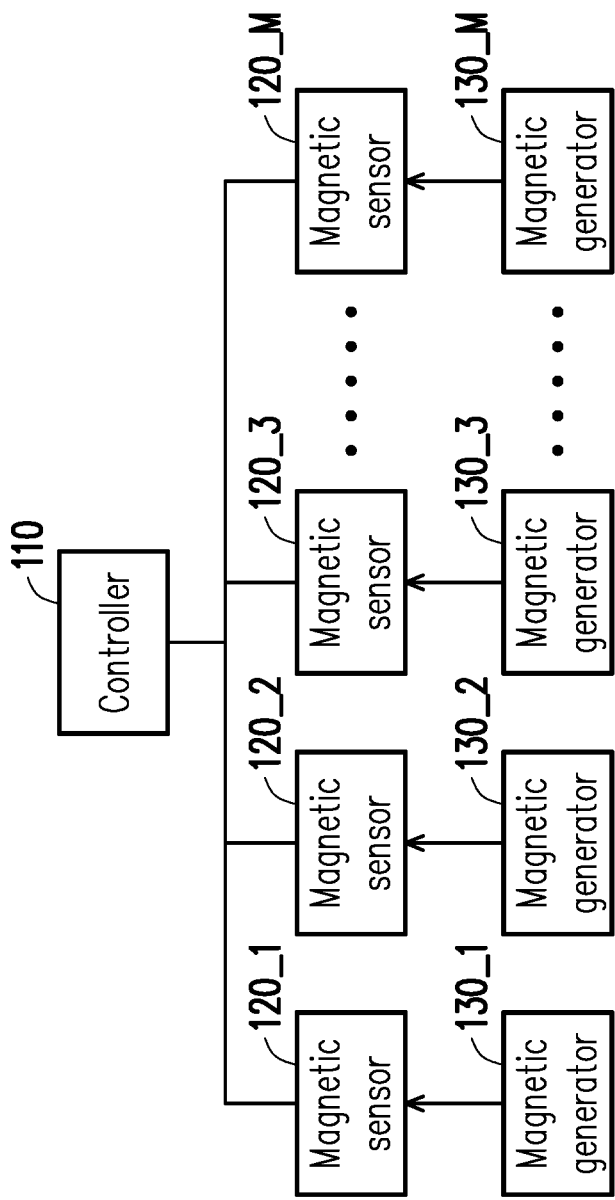
FIG. 1 is a block diagram of a gesture input device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram of a gesture input device according to an embodiment of the disclosure. Referring to FIG. 1, the gesture input device 100 includes a controller 110, magnetic sensors 120_1-120_M and magnetic generators 130_1-130_M, where M is a positive integer greater than zero. In the embodiment, the gesture input device 100 may be configured on a wearable object, or the gesture input device 100 may even include a wearable object, where the wearable object is, for example, a glove or a wristband. In an embodiment, the magnetic sensors 120_1-120_M and the magnetic generators 130_1-130_M are respectively disposed at two sides of bendable portions of the wearable object, for example, two sides of finger joints, a wrist or an elbow. The magnetic generators 130_1-130_M and the magnetic sensors 120_1-120_M are disposed in pairs, such that the magnetic sensors 120_1-120_M may respectively sense the magnetic signals provided by the corresponding magnetic generators 130_1-130_M. Namely, when a gesture of the user's hand changes, magnetic field strengths of the magnetic signals respectively sensed by the magnetic sensors 120_1-120_M are changed along with a change of relative positions between the magnetic sensors 120_1-120_M and the magnetic generators 130_1-130_M. Therefore, the controller may determine a gesture of the user according to signals generated by the magnetic sensors 120_1-120_M, so as to produce more user operation methods.

In the embodiment, the magnetic sensors 120_1-120_M are Hall sensors, and the magnetic generators 130_1-130_M are magnetic field generation elements, such as magnets or electromagnetic coils. The magnetic sensors 120_1-120_M are configured to sense a plurality of magnetic signals provided by the magnetic generators 130_1-130_M and respectively generate voltage signals according to the sensed magnetic signals. Moreover, the magnetic sensors 120_1-120_M transmit the voltage signals to the controller 110, and the controller 110 generates corresponding gesture information according to the voltage signals. In this embodiment, the closer the distances between the magnetic sensors 120_1-120_M and the corresponding magnetic generators 130_1-130_M are, the higher the voltage levels of the output voltage signals are. Namely, when the distances between the magnetic sensors 120_1-120_M and the corresponding magnetic generators 130_1-130_M are changed, the voltage signals correspondingly generated by the magnetic sensors 120_1-120_M are accordingly changed. In other embodiments, the magnetic sensors 120_1-120_M may also be configured to generate lower voltage levels of the voltage signals when the distances between the magnetic sensors 120_1-120_M and the corresponding magnetic generators 130_1-130_M are closer.

However, the magnetic sensors 120_1-120_M and the magnetic generators 130_1-130_M are not limited to be disposed on a same wearable object. In an embodiment, the magnetic generators 130_1-130_M may also be disposed on an external object, for example, a handheld object, a belt object, or another wearable object. Moreover, the controller 110 may provide an interactive information between the wearable object and the external object according to the magnetic field strengths of the magnetic signals sensed by the magnetic sensors 120_1-120_M and a pairing result between the magnetic sensors 120_1-120_M and the magnetic generators 130_1-130_M. The pairing result may be derived by the controller 110 from the voltage signals generated by the magnetic sensors 120_1-120_M.

The controller 110 may be implemented by a Central Processing Unit (CPU), or other programmable general purpose or special purpose microprocessor, a Digital Signal Processor (DSP), a Programmable Logic Controller (PLC), an Application Specific Integrated Circuits (ASIC), a Programmable Logic Device (PLD), other similar processing circuit or a combination of the aforementioned circuits.

FIGS. 2A to 4B illustrate an example where the magnetic sensors and the magnetic generators are all disposed on a same wearable object (not shown in the figures).

Figure 2A:
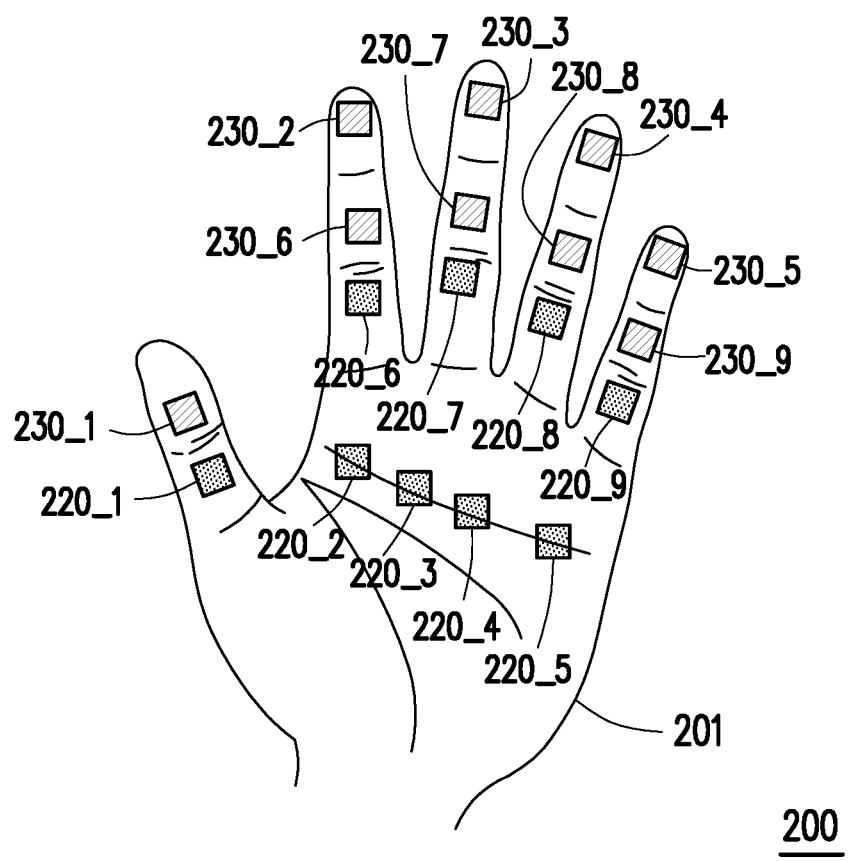
FIG. 2A is a schematic diagram of a gesture according to an embodiment of the disclosure.
Figure 2B:
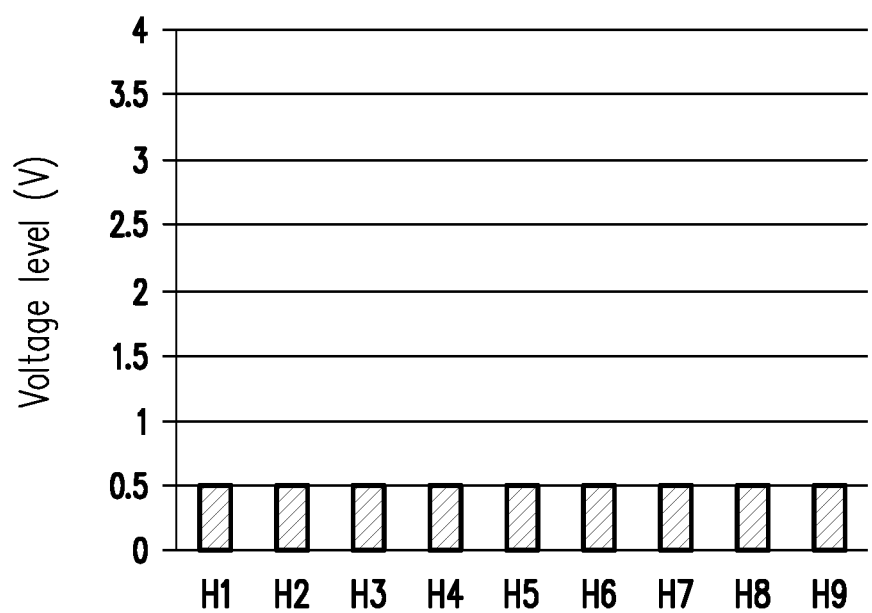
FIG. 2B is a diagram illustrating voltage signals generated by the magnetic sensors in the embodiment of FIG. 2A.

FIG. 2A is a schematic diagram of a gesture according to an embodiment of the disclosure. FIG. 2B is a diagram illustrating voltage signals generated by the magnetic sensors in the embodiment of FIG. 2A. Referring to FIGS. 2A and 2B, the gesture input device 200 of the embodiment includes a controller (not shown), magnetic sensors 220_1-220_9 and magnetic generators 230_1-230_9. FIG. 2A illustrates relative positions of the magnetic sensors 220_1-220_9 and the magnetic generators 230_1-230_9 disposed on a wearable object 201 and their relative positions with respect to a user's hand. In the embodiment, the wearable object 201 is a glove, and FIG. 2A presents a state that the wearable object 201 is worn on the user's hand, and all fingers of the user's hand are straightened with the user's palm up. The magnetic sensors 220_1-220_9 and the magnetic generators 230_1-230_9 may be disposed at two sides of finger joints or a palm bending portion of the wearable object 201. The magnetic sensors 220_1-220_9 are respectively disposed corresponding to the magnetic generators 230_1-230_9, and the magnetic sensors 220_1-220_9 correspondingly generate the voltage signals H1-H9 shown in FIG. 2B according to magnetic field strengths of the sensed magnetic signals. Namely, when the gesture of the user is opening all fingers, since the distances between the magnetic sensors 220_1-220_9 and the magnetic generators 230_1-230_9 are far away, the magnetic field strengths of the magnetic signals sensed by the magnetic sensors 220_1-220_9 are relatively low. Therefore, the voltage signals H1-H9 all have a lower voltage level. The controller may determine that the palm of the user is in an open state according to the voltage signals H1-H9 generated by the magnetic sensors 220_1-220_9.

Figure 3A:
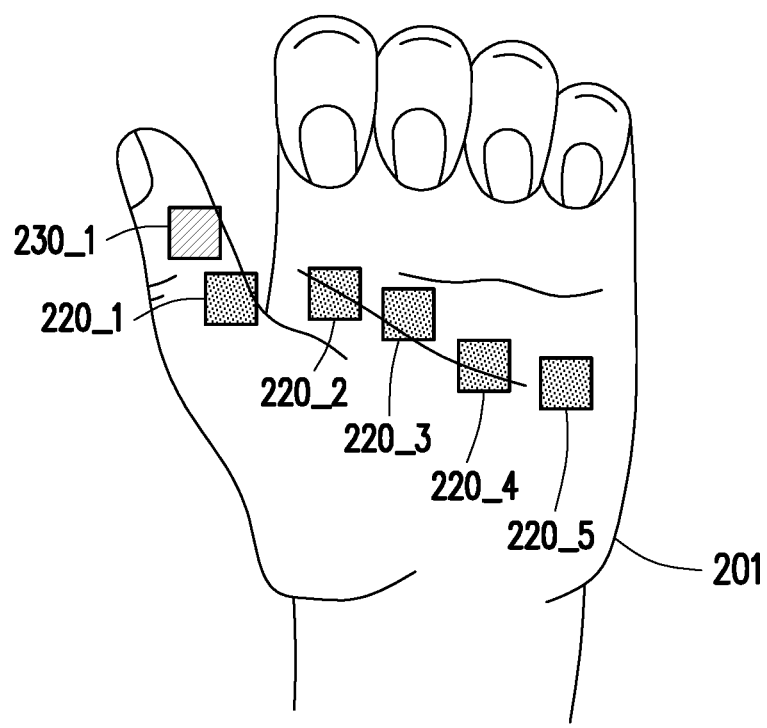
FIG. 3A is a schematic diagram of another gesture according to the embodiment in FIG. 2A.
Figure 3B:
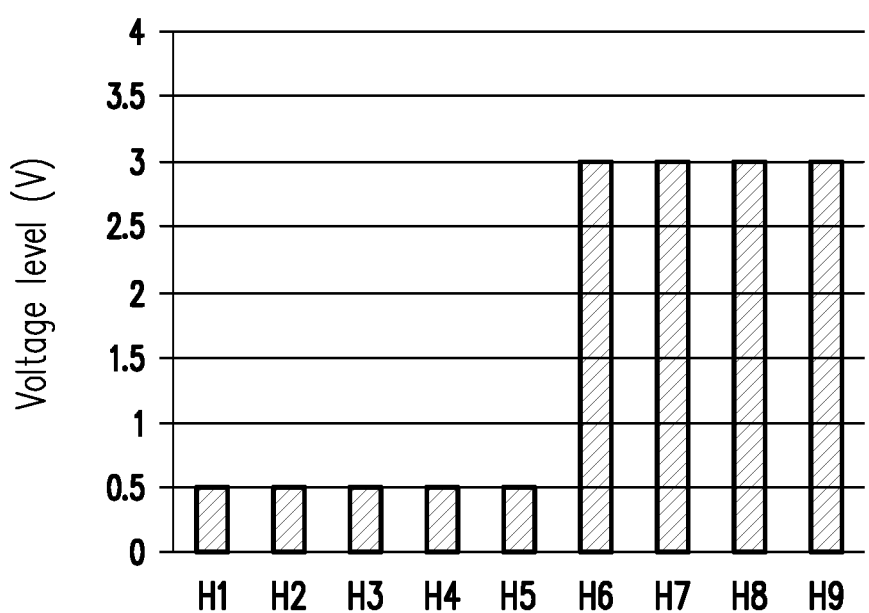
FIG. 3B is a diagram illustrating voltage signals generated by the magnetic sensors in the embodiment of FIG. 3A.

FIG. 3A is a schematic diagram of another gesture according to the embodiment in FIG. 2A, and FIG. 3A illustrates a state that the user bends a part of the finger joints with the palm up when wearing the gesture input device 200. FIG. 3B is a diagram illustrating voltage signals generated by the magnetic sensors in the embodiment of FIG. 3A. Referring to FIGS. 2A, 2B, 3A and 3B, the gesture of the user is bending an index finger, a middle finger, a ring finger and a little finger. Compared to FIG. 2A, the distances between the magnetic sensors 220_6-220_9 and the magnetic generators 230_6-230_9 are closer, and the distances between the magnetic sensors 220_1-220_5 and the magnetic generators 230_1-230_5 still remain far. The magnetic field strengths of the magnetic signals sensed by the magnetic sensors 220_1-220_5 are relatively low, and the magnetic field strengths of the magnetic signals sensed by the magnetic sensors 220_6-220_9 are relatively high. Therefore, compared to FIG. 2B, the voltage signals H1-H5 are still in the lower voltage level, while the voltage signals H6-H9 are in a higher voltage level. The controller may determine that the palm of the user is in a half-fisted state according to the voltage signals H1-H9 generated by the magnetic sensors 220_1-220_9.

Figure 4A:
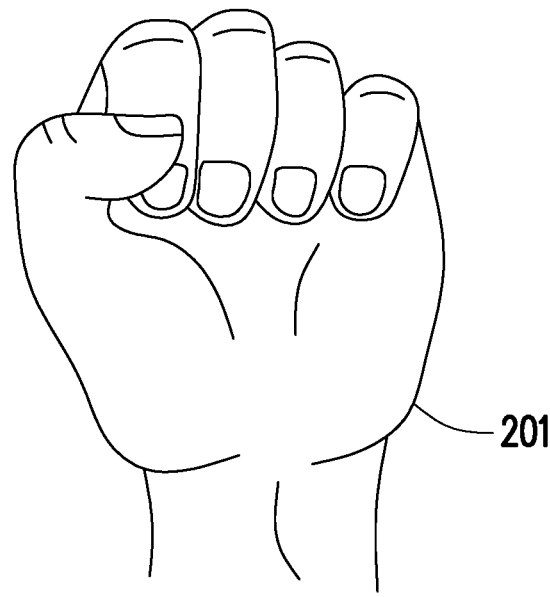
FIG. 4A is a schematic diagram of still another gesture according to the embodiment in FIG. 2A.
Figure 4B:
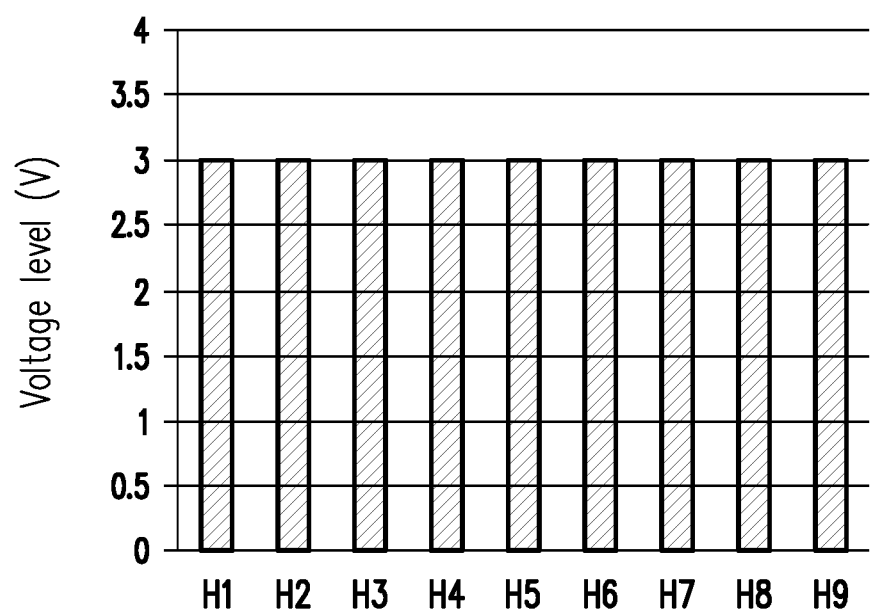
FIG. 4B is a diagram illustrating voltage signals generated by the magnetic sensors in the embodiment of FIG. 4A.

FIG. 4A is a schematic diagram of still another gesture according to the embodiment in FIG. 2A, and illustrates a state that the user makes a fist with the palm up when wearing the gesture input device 200. FIG. 4B is a diagram illustrating voltage signals generated by the magnetic sensors in the embodiment of FIG. 4A. Referring to FIGS. 2A, 2B, 3A 3B, 4A and 4B, the gesture of the user is a fist. Compared to FIG. 2A and FIG. 3A, the distances between the magnetic sensors 220_1-220_9 and the magnetic generators 230_1-230_9 are closer, the magnetic field strengths of the magnetic signals sensed by the magnetic sensors 220_1-220_9 are all relatively high. Compared to FIG. 2B and FIG. 3B, the voltage signals H1-H9 of FIG. 4B are all in a higher voltage level. The controller may determine that the palm of the user is in a full fisted state according to the voltage signals H1-H9 generated by the magnetic sensors 220_1-220_9.

Therefore, as shown in FIGS. 2A to 4B, when the wearable object 201 changes the relative positions between the magnetic sensors 220_1-220_9 and the magnetic generators 230_1-230_9 along with different gestures of the user, the voltage signals H1-H9 generated by the magnetic sensors 220_1-220_9 are correspondingly changed. In this case, the controller may generate corresponding gesture information according to the magnitudes and the variations of the voltage signals H1-H9. Moreover, the voltage levels shown in FIGS. 2B, 3B and 4B are only illustrative and used for representing a relative relationship of the voltage levels corresponding to different gestures of the user. Specific values of each of the voltage levels of the voltage signals H1-H9 outputted by the magnetic sensors 220_1-220_9 are determined according to different gesture variations. The magnitudes of the voltage levels H1-H9 can therefore be configured to be the same or different respectively in FIGS. 2B, 3B and 4B.

Figure 5B:
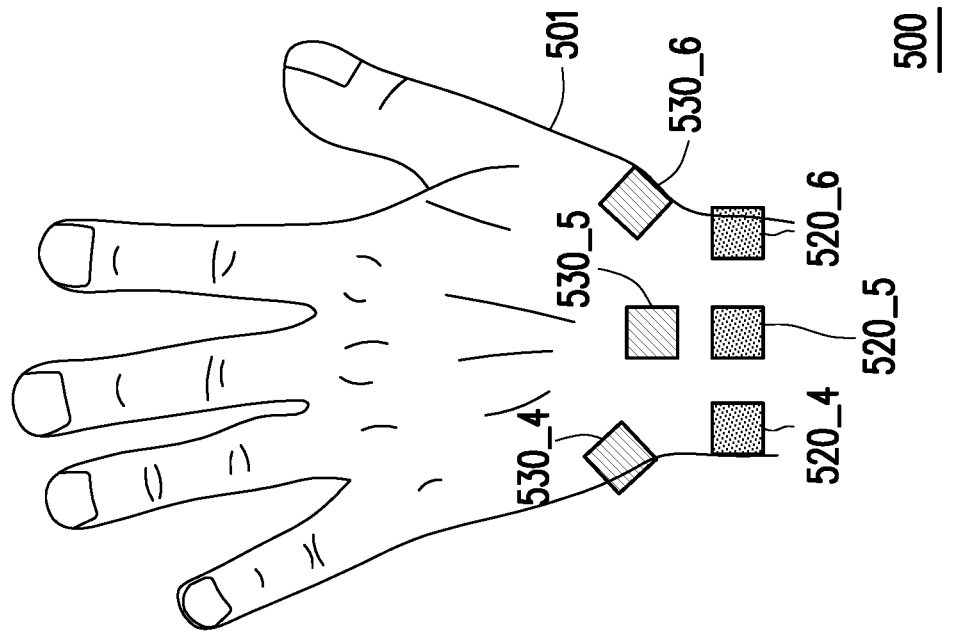
FIG. 5B is a back view of a wearable object according to the embodiment in FIG. 5A.
Figure 5A:
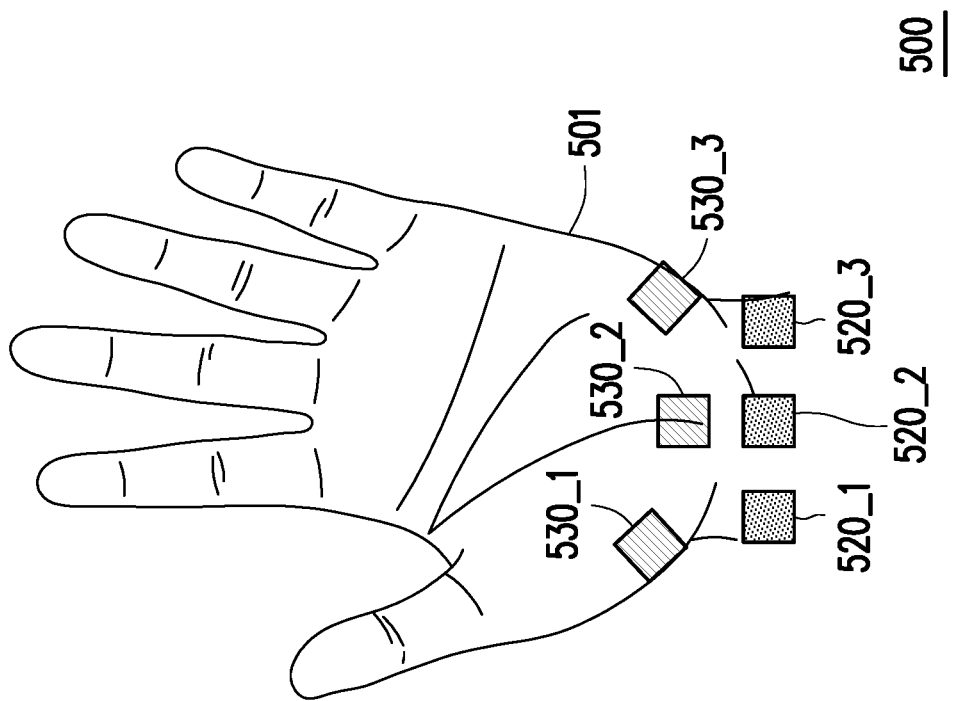
FIG. 5A is a front view of a wearable object according to another embodiment of the disclosure.

FIGS. 5A and 5B illustrate another embodiment of disposing the magnetic sensors and the magnetic generators on a wearable object.

FIG. 5A is a front view of a wearable object according to another embodiment of the disclosure, and illustrates the user's hand in a palm up state when the user wears a gesture input device 500. FIG. 5B is a back view of a wearable object according to the embodiment in FIG. 5A, and illustrates the user's hand in a palm down state when the user wears the gesture input device 500. Referring to FIGS. 5A and 5B, the gesture input device 500 of the embodiment includes a controller (not shown), magnetic sensors 520_1-520_6 and magnetic generators 530_1-530_6. FIGS. 5A and 5B respectively represent relative positions of the magnetic sensors 520_1-520_6 and the magnetic generators 530_1-530_6 on a wearable object 501 and their relative positions with respect to a user's hand.

In the embodiment, the wearable object 501 is a glove or a wristband. As shown in FIG. 5A, the magnetic sensors 520_1-520_3 are disposed at one side of a joint on a front side of the wrist of the wearable object 501, and the magnetic generators 530_1-530_3 are disposed at another side of the joint on the front side of the wrist of the wearable object 501. As shown in FIG. 5B, the magnetic sensors 520_4-520_6 are disposed at one side of the joint on a back side of the wrist of the wearable object 501, and the magnetic generators 530_4-530_6 are disposed at another side of the joint on the back side of the wrist of the wearable object 501. Namely, when the user changes a gesture of the wrist, the magnetic sensors 520_1-520_6 may correspondingly generate a plurality of voltage signals according to distance variations between the magnetic sensors 520_1-520_6 and the magnetic generators 530_1-530_6. Therefore, when the user rotates the wrist, the controller of the gesture input device 500 may effectively sense a gesture change according to the voltage signals provided by the magnetic sensors 520_1-520_6, and generate the corresponding gesture information according to the magnitudes and the variations of the voltage signals.

For example, when the user's wrist is bent towards the palm, voltage levels of the voltage signals sensed by the magnetic sensors 520_1-520_3 are increased to a higher level, and voltage levels of the voltage signals sensed by the magnetic sensors 520_4-520_6 are not increased or even decreased to a lower level. Therefore, the controller may determine that the user's wrist is bent towards the palm according to the voltage signals sensed by the magnetic sensors 520_1-520_6. When the user's wrist is bent towards the back of the hand, the voltage levels of the voltage signals sensed by the magnetic sensors 520_1-520_3 are not increased or even decreased to a lower level, and the voltage levels of the voltage signals sensed by the magnetic sensors 520_4-520_6 are increased to a higher level. Therefore, the controller may determine that the user's wrist is bent towards the back of the hand according to the voltage signals sensed by the magnetic sensors 520_1-520_6.

Figure 6A:
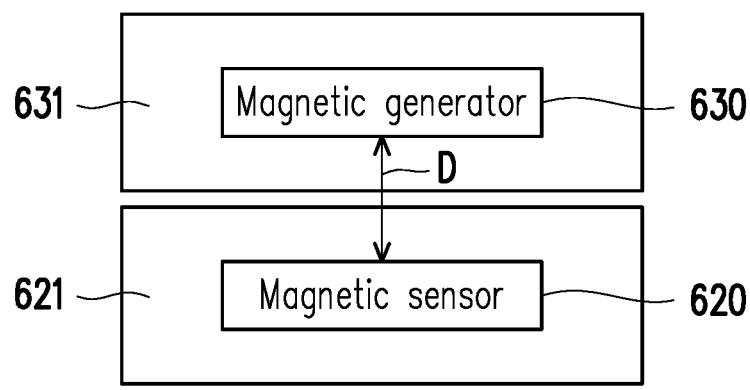
FIGS. 6A and 6B are schematic diagrams illustrating configurations of magnetic sensors and magnetic generators according to an embodiment of the disclosure.
Figure 6B:
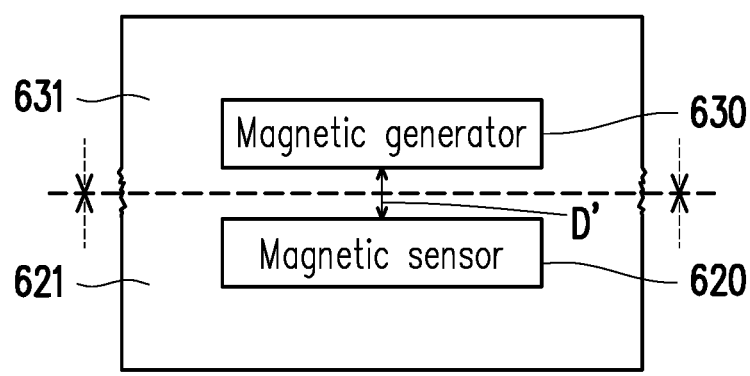

FIGS. 6A and 6B are schematic diagrams illustrating configurations of the magnetic sensors and the magnetic generators according to an embodiment of the disclosure. In the embodiment, the wearable object includes a plurality of elastic materials used for wrapping the magnetic sensors and the magnetic generators. In another embodiment, the entire wearable object may be implemented by adopting the elastic material, and the magnetic sensors and the magnetic generators are wrapped in the elastic material. In yet another embodiment, the elastic material of the wearable object may only wrap one of the magnetic sensors and the magnetic generators. Referring to FIGS. 6A and 6B, a magnetic sensor 620 is embedded in the elastic material of a portion 621 of the wearable object, and a magnetic generator 630 is embedded in the elastic material of another portion 631 of the wearable object. In an embodiment, the elastic material is manufactured through embedded injection of silicon rubber, or implemented by adopting a flexible fabric wrapping structure. The elastic material may be implemented through calculation or through a combination of materials with different elastic coefficients (or referred to as Young's modulus), so as to cope with a required operation feeling.

As shown in FIG. 6A, the magnetic sensor 620 and the magnetic generator 630 have a distance D there between. The distance D without deforming the portions 621 or 631 is greater than or equal to the sum of a distance between the magnetic sensor 620 and a surface of the portion 621 of the wearable object (a surface close to the other portion 631 of the wearable object) and a distance between the magnetic generator 630 and a surface of the other portion 631 of the wearable object (a surface close to the portion 621 of the wearable object). As shown in FIG. 6B, the magnetic sensor 620 and the magnetic generator 630 have a distance D' there between. When the portion 621 and the other portion 631 of the wearable object are squeezed, the distance D' is smaller than the aforementioned distance D. Namely, when the portion 621 and the other portion 631 of the wearable object are squeezed and deformed, the magnetic sensor 620 is closer to the magnetic generator 630 in FIG. 6B. The magnetic field strength of the magnetic signal provided by the magnetic generator 630 that is sensed by the magnetic sensor 620 and the corresponding sensed voltage signal are higher than that of the situation of FIG. 6A. Therefore, the controller of the gesture input device may not only determine the gesture of the user but may also a strength of a force exerted by the user according to the voltage signal sensed by the magnetic sensor 620.

Figure 7:
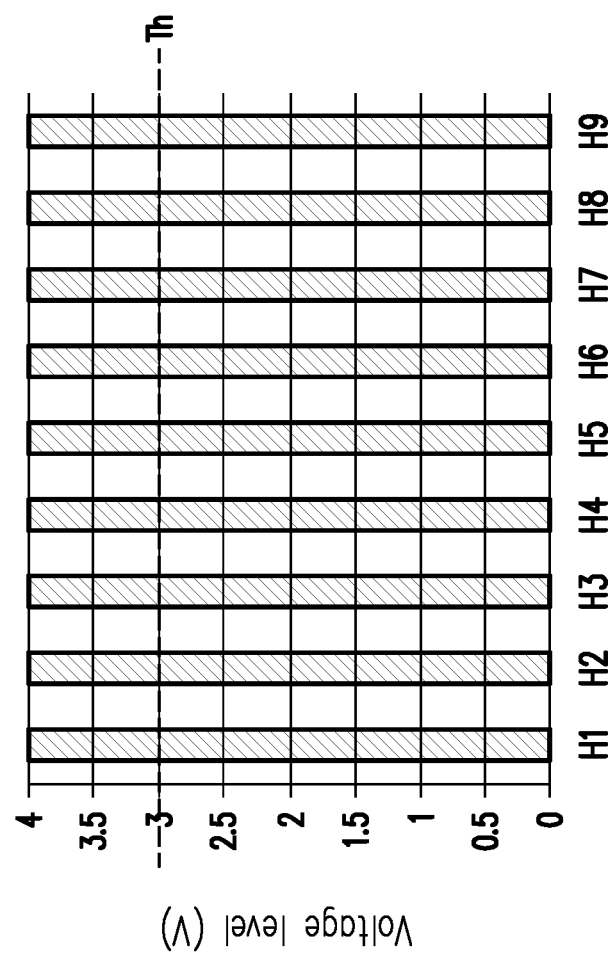
FIG. 7 is another diagram illustrating voltage signals in the embodiment of FIG. 4A.

Similar to the embodiment of FIGS. 6A and 6B, FIG. 7 is another diagram illustrating voltage signals in the embodiment of FIG. 4A. Referring to FIGS. 4A, 4B and 7, the material of the wearable object 201 is the elastic material and the user makes a fist and clenches by exerting a force. Since the distances between the magnetic sensors 220_1-220_9 and the magnetic generators 230_1-230_9 are shortened, voltage levels of the voltage signals H1-H9 are higher than those shown in FIG. 4B. For example, when the gesture of the user is a fist and the user does not exert a force to clench, a highest value of the voltage levels of the voltage signals H1-H9 is 3 volts (as shown in FIG. 4B). However, when the gesture of the user is the fist and the user exerts a force to clench, the voltage levels of the voltage signals H1-H9 are higher than 3V of FIG. 4B (as shown in FIG. 7). Namely, the controller of the embodiment may further set a predetermined threshold Th (for example 3V). When the controller determines that a voltage level of the voltage signal provided by a certain magnetic sensor is higher than the predetermined threshold Th, the controller may further provide corresponding pressure information according to the voltage signal provided by the magnetic sensor. In the embodiment, the voltage signals generated under user's lighter pressures and heavier pressures may have different voltage levels, and the pressure information may be a pressing depth value or a pressure value calculated based on a specific algorithm according to the voltage levels.

Figure 8A:
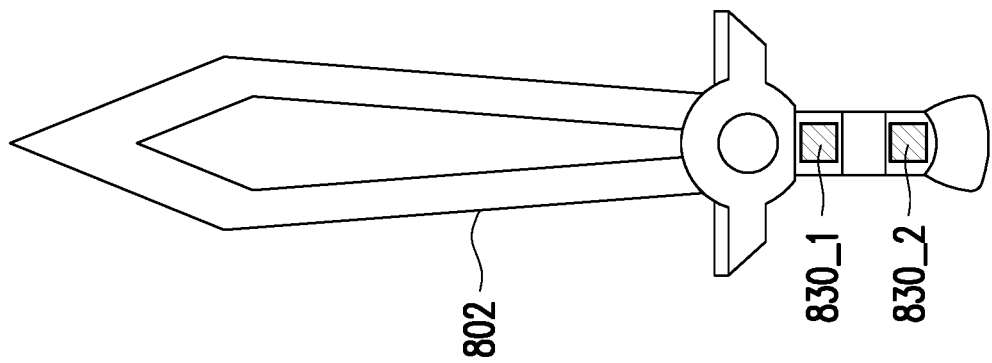
FIG. 8A is a schematic diagram of a handheld object according to another embodiment of the disclosure.
Figure 8B:
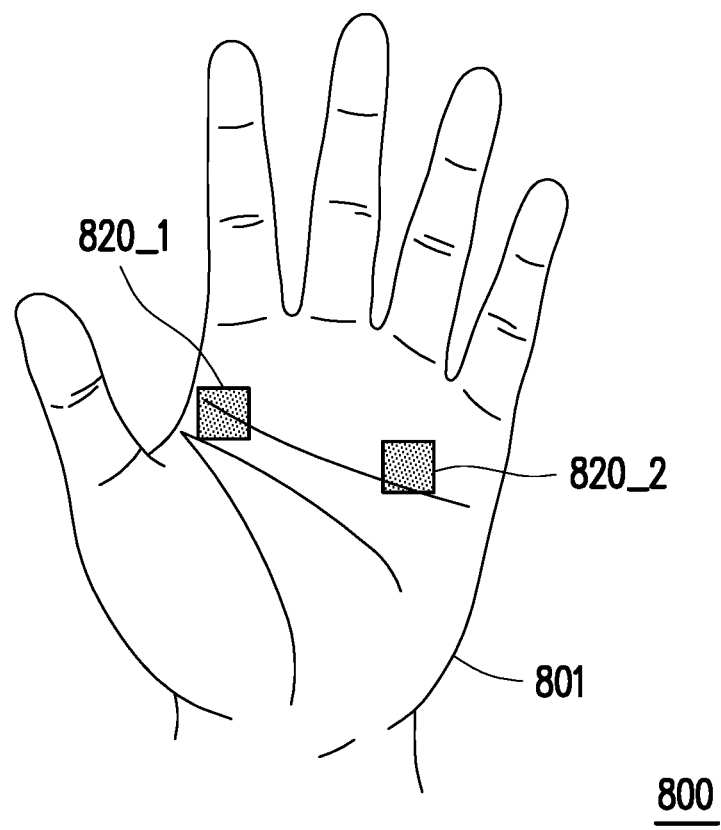
FIG. 8B is a schematic diagram of a gesture input device according to the embodiment in the FIG. 8A.

FIGS. 8A and 8B illustrate another embodiment of disposing the magnetic sensors on a wearable object, and disposing the magnetic generators on a handheld object.

FIG. 8A is a schematic diagram of a handheld object according to another embodiment of the disclosure. FIG. 8B is a schematic diagram of a gesture input device according to the embodiment in the FIG. 8A. Referring to FIGS. 8A and 8B, magnetic generators 830_1 and 830_2 are disposed on a holding portion of the handheld object 802, and the gesture input device 800 includes a controller (not shown) and magnetic sensors 820_1 and 820_2. The wearable object 801 is a glove, and the magnetic sensors 820_1 and 820_2 are disposed at two sides of the palm of the wearable object 801. In the embodiment, the magnetic generators 830_1 and 830_2 and the magnetic sensors 820_1 and 820_2 are disposed corresponding to each other. When the user holds the handheld object 802 through the wearable object 801, the magnetic sensors 820_1 and 820_2 may sense the magnetic signals respectively provided by the magnetic generators 830_1 and 830_2. Therefore, the controller of the gesture input device 800 may determine a manner that the user holds the handheld object 802 through the wearable object 801 according to a pairing result between the magnetic sensors 820_1 and 820_2 and the magnetic generators 830_1 and 830_2, so as to generate holding information.

To be specific, the controller of the gesture input device 800 may identify whether the user holds the handheld object 802 in an upward manner or a downward manner through the wearable object 801 according to the magnetic signals. The magnetic signals are provided by the magnetic generator 830_1 or 830_2, and the magnetic signals are individually sensed by the magnetic sensor 820_1 and the magnetic sensor 820_2. For example, the magnetic generator 830_1 may have a magnetic strength stronger than that of the magnetic generator 830_2. When the controller determines that the user holds the handheld object 802 according to the voltage signals generated by the magnetic sensors 820_1 and 820_2, and determines that the voltage signal generated by the magnetic sensor 820_1 is greater than the voltage signal generated by the magnetic sensor 820_2, the controller may determine that the user holds the handheld object 802 in the upward manner. When the controller determines that the voltage signal generated by the magnetic sensor 820_1 is smaller than the voltage signal generated by the magnetic sensor 820_2 according to the voltage signals generated by the magnetic sensors 820_1 and 820_2, the controller may determine that the user holds the handheld object 802 in the downward manner.

Figure 9:
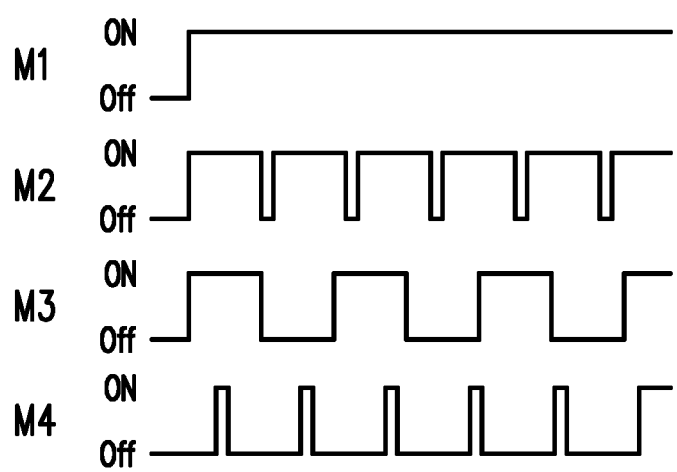
FIG. 9 is a schematic diagram of magnetic signals according to an embodiment of the disclosure.

FIG. 9 is a schematic diagram of magnetic signals according to an embodiment of the disclosure. Referring to FIG. 9, in order to avoid wrong judgement of the magnetic sensors caused by interference between different magnetic signals provided by different magnetic generators, a plurality of magnetic signals are further designed in the embodiment, such that the magnetic signals may be differentiated and distinguished. For example, the magnetic signals M1-M4 may be designed to have different periodic magnetic field variations, such that the corresponding magnetic sensors may effectively distinguish the magnetic signals M1-M4 generated by different magnetic generators.

For example, referring to FIGS. 2A and 3A, the magnetic signals respectively provided by the magnetic generators 230_6-230_9 may be the magnetic signals M1-M4 shown in FIG. 9, where the magnetic generators 230_6-230_9 are electromagnetic coils. It should be noted that the electromagnetic coils may receive modulated electric signals provided by a Pulse Width Modulator (PWM), so as to provide modulated magnetic signals. When the user bends the fingers, the magnetic signal sensed by each of the magnetic sensors 220_6-220_9 probably includes magnetic signals provided by other adjacent magnetic generators. Therefore, the controller of the gesture input device 200 may be configured to respectively filter the voltage signals provided by the magnetic sensors 220_6-220_9, so as to identify the desired voltage signals according to the magnetic signals with different periodic magnetic field variations. The controller may correctly analyze the voltage signals provided by the magnetic sensors 220_6-220_9 to obtain the correct gesture information.

Figure 10:
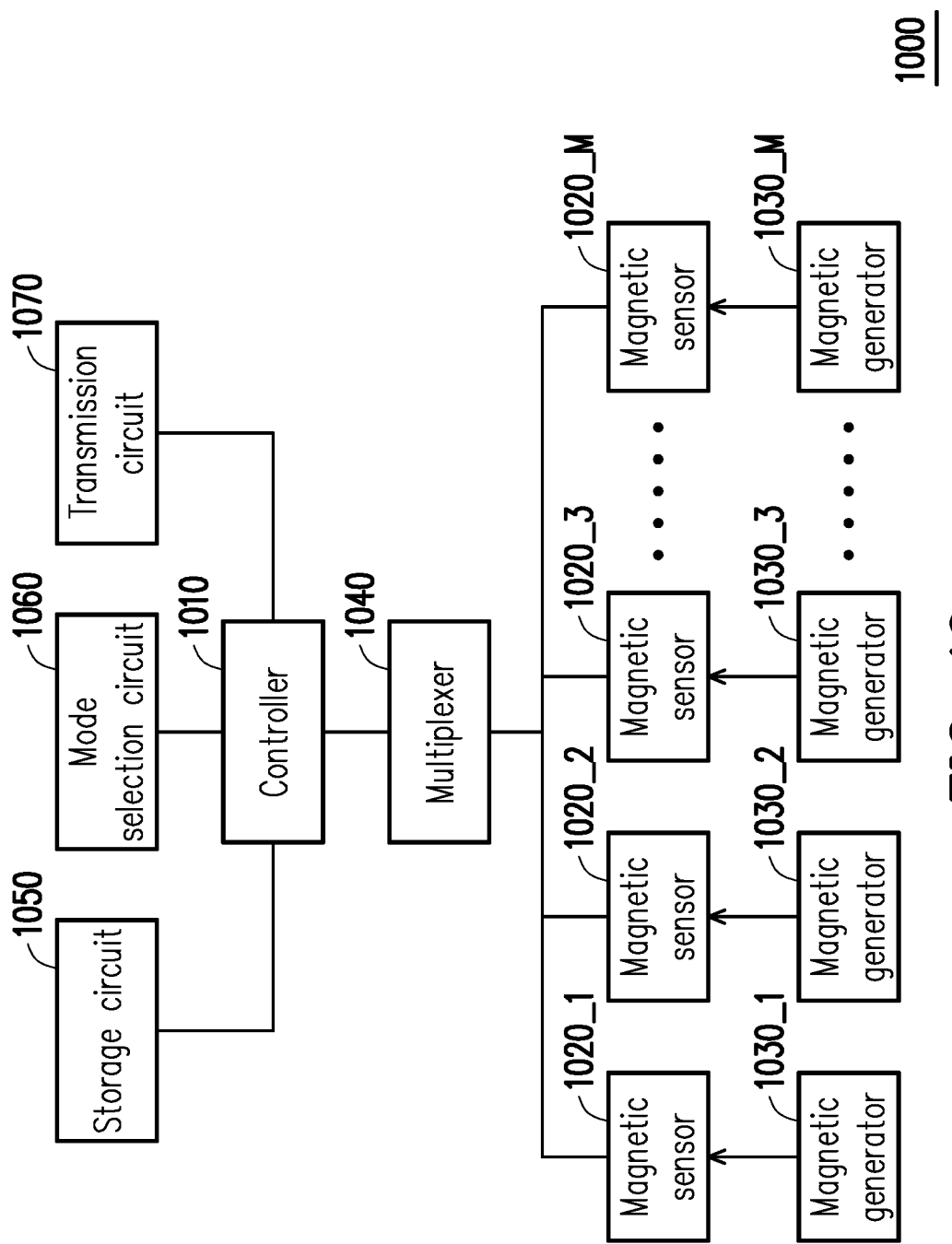
FIG. 10 is a block diagram of a gesture input device according to another embodiment of the disclosure.

FIG. 10 is a block diagram of a gesture input device according to another embodiment of the disclosure. Referring to FIG. 10, the gesture input device 1000 includes a controller 1010, magnetic sensors 1020_1-1020_M, magnetic generators 1030_1-1030_M, a multiplexer 1040, a storage circuit 1050, a mode selection circuit 1060 and a transmission circuit 1070, where M is a positive integer greater than 0. In the embodiment, the gesture input device 1000 includes a wearable object, such as a glove or a wristband. The magnetic sensors 1020_1-1020_M and the magnetic generators 1030_1-1030_M are respectively disposed at two sides of a bendable part of the wearable object. The magnetic generators 1030_1-1030_M may be disposed on the wearable object or an external object, and disposed corresponding to the magnetic sensors 1020_1-1020_M.

In the embodiment, the magnetic sensors 1020_1-1020_M are respectively paired to the magnetic generators 1030_1-1030_M. The magnetic sensors 1020_1-1020_M may sense the magnetic signals provided by the magnetic generators 1030_1-1030_M, and correspondingly provide a plurality of voltage signals. In the embodiment, the controller 1010 is coupled to the magnetic sensors 1020_1-1020_M through the multiplexer 1040. The controller 1010 receives the voltage signals provided by the magnetic sensors 1020_1-1020_M in a time-division manner.

The storage circuit 1050 may include a memory, and is configured to store a mode Look-Up Table (LUT). The mode selection circuit 1060 is an application or a module executed by the controller 1010. In the embodiment, the controller 1010 may communicate with an external computer device through the transmission circuit 1070. The controller 1010 may provide the gesture information, the pressure information or the holding information mentioned in the aforementioned embodiments to the external computer device. The transmission circuit 1070 may be a wired or wireless communication module, for example, a Bluetooth transmission module, a Wireless Local Area Network (WLAN) transmission module, an Infrared (IR) transmission module or a wired transmission module.

In the embodiment, the gesture input device 1000 may receive an instruction provided by the external computer device through the transmission circuit 1070 to provide a mode selection signal to the controller 1010. The controller 1010 may search the mode LUT recorded in the storage circuit 1050 to provide a corresponding control instruction to the magnetic sensors 1020_1-1020_M. The external computer device may be a host of a virtual reality device. When the external computer device executes a specific application, the external computer device may request the gesture input device 1000 to selectively turn on at least one of the magnetic sensors 1020_1-1020_M to perform gesture detection. The gesture input device 1000 is unnecessary to turn on all of the magnetic sensors 1020_1-1020_M, so as to effectively avoid touch by mistake. Therefore, the gesture input device 1000 in the embodiment may provide an accurate and flexible gesture detection function, so as to effectively provide the gesture information to the external computer device.

The features and operations of the gesture input device 1000 of the embodiment may be referred to related descriptions of the embodiments of FIGS. 1 to 9 above and not repeated.

In summary, the gesture input device of the disclosure is adapted to dispose a plurality of magnetic sensors and corresponding magnetic generators on a wearable object. When the user's hand wears the wearable object, the gesture input device may obtain corresponding gesture information according to sensing results of the magnetic sensors. Since the relative positions between the magnetic sensors and the magnetic generators are correspondingly changed along with a change of a gesture variation of the user's hand, the magnetic signals sensed by the magnetic sensors may be correspondingly changed. Namely, the gesture input device of the disclosure may provide an instant and effective gesture detection function, and may provide the gesture information to the external computer device for the use of the specific application. Moreover, the gesture input device of the disclosure may effectively detect a force exerting situation of the user's hand, so as to provide pressure information for hand pressing or hand holding. That is, the magnetic generators of the disclosure may also be disposed on an external handheld object, such that the gesture input device of the disclosure may provide holding information related to a manner of holding the handheld object by the user through the wearable object.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A gesture input device, configured to interact with a wearable object on which a plurality of magnetic generators are disposed, comprising:
    a plurality of magnetic sensors, disposed on the wearable object, and configured to sense a plurality of magnetic signals provided by the magnetic generators and generate a plurality of voltage signals according to the magnetic signals; and
    a controller, coupled to the magnetic sensors and configured to receive the voltage signals,
    wherein when the wearable object is worn on a user's hand, the magnetic generators and the magnetic sensors are respectively located at two sides of a plurality of joints of the user's hand such that the magnetic sensors are closer to a palm of the user's hand than the magnetic generators, and when a change of a gesture of the user's hand results in different relative positions of the magnetic generators and the magnetic sensors, at least one of the voltage signals generated by the magnetic sensors is correspondingly changed, and the controller determines that the gesture of the user's hand according to the voltage signals.

2. The gesture input device as claimed in claim 1, wherein at least one of the magnetic sensors and the magnetic generators is embedded in an elastic material.

3. The gesture input device as claimed in claim 2, wherein when the controller determines that a voltage value of at least one of the voltage signals is higher than a predetermined threshold, the controller further analyzes the voltage value to generate a pressure information.

4. The gesture input device as claimed in claim 1, wherein the magnetic signals provided by the magnetic generators have different periodic magnetic field variations.

5. The gesture input device as claimed in claim 1, wherein the controller selectively turns on at least one of the magnetic sensors according to a mode selection signal.

6. The gesture input device as claimed in claim 1, further comprising:
    a transmission circuit, coupled to the controller and configured to communicate with an external computer device, wherein the controller generates a gesture information according to a change of the voltage signals and provides the gesture information to the external computer device through the transmission circuit.

7. A gesture input device, configured to interact with a handheld object wherein a plurality of magnetic generators are disposed on a holding portion of the handheld object, comprising:
    a plurality of magnetic sensors, disposed on a wearable object, and configured to sense a plurality of magnetic signals provided by the magnetic generators and generate a plurality of voltage signals according to the magnetic signals; and a controller, coupled to the magnetic sensors and configured to receive the voltage signals, wherein when the wearable object is worn on a user's hand, the magnetic sensors are respectively located at a palm of the user's hand, and when the user's hand holds the holding portion of the handheld object, the magnetic sensors sense the magnetic signals provided by the magnetic generators and at least one of the voltage signals generated by the magnetic sensors is correspondingly changed, and the controller determines a manner that the user's hand holds the handheld object according to a pairing result between the magnetic sensors and the magnetic generators which is derived from the voltage signals generated by the magnetic sensors.

8. The gesture input device as claimed in claim 7, wherein the magnetic signals provided by the magnetic generators have different periodic magnetic field variations.

9. The gesture input device as claimed in claim 7, wherein the controller selectively turns on at least one of the magnetic sensors according to a mode selection signal.

10. The gesture input device as claimed in claim 7, further comprising:

a transmission circuit, coupled to the controller and configured to communicate with an external computer device, wherein the controller generates a gesture information according to a change of the voltage signals and provides the gesture information to the external computer device through the transmission circuit.

11. A gesture input device, configured to interact with a wearable object on which a plurality of magnetic generators are disposed, and interact with a handheld object, wherein another plurality of magnetic generators are disposed on a holding portion of the handheld object, comprising:

a plurality of magnetic sensors, disposed on the wearable object, and configured to sense a plurality of magnetic signals provided by the magnetic generators and generate a plurality of voltage signals according to the magnetic signals;

another plurality of magnetic sensors, disposed on the wearable object, and configured to sense another plurality of magnetic signals provided by the another magnetic generators and generate another plurality of voltage signals according to the another magnetic signals; and a controller, coupled to the magnetic sensors and the another magnetic sensors, and configured to receive the voltage signals and the another voltage signals, wherein when the wearable object is worn on a user's hand, the magnetic generators and the magnetic sensors are respectively located at two sides of a plurality of joints of the user's hand such that the magnetic sensors are closer to a palm of the user's hand than the magnetic generators, and when a change of a gesture of the user's hand results in different relative positions of the magnetic generators and the magnetic sensors, at least one of the voltage signals generated by the magnetic sensors is correspondingly changed, and the controller determines that the gesture of the user's hand according to the voltage signals, wherein the another magnetic sensors are respectively located at the palm of the user's hand, and when the user's hand holds the holding portion of the handheld object, the another magnetic sensors sense the another magnetic signals provided by the another magnetic generators and at least one of the another voltage signals generated by the another magnetic sensors is correspondingly changed, and the controller determines a manner that the user's hand holds the handheld object according to a pairing result between the another magnetic sensors and the another magnetic generators which is derived from the another voltage signals generated by the another magnetic sensors.

12. The gesture input device as claimed in claim 11, wherein at least one of the magnetic sensors and the magnetic generators is embedded in an elastic material.

13. The gesture input device as claimed in claim 12, wherein when the controller determines that a voltage value of at least one of the voltage signals is higher than a predetermined threshold, the controller further analyzes the voltage value to generate a pressure information.

14. The gesture input device as claimed in claim 11, wherein the magnetic signals provided by the magnetic generators have different periodic magnetic field variations.

15. The gesture input device as claimed in claim 11, wherein the controller selectively turns on at least one of the magnetic sensors according to a mode selection signal.

16. The gesture input device as claimed in claim 11, further comprising:

a transmission circuit, coupled to the controller and configured to communicate with an external computer device, wherein the controller generates a gesture information according to a change of the voltage signals and provides the gesture information to the external computer device through the transmission circuit.

17. The gesture input device as claimed in claim 11, wherein the another magnetic signals provided by the another magnetic generators have different periodic magnetic field variations.

18. The gesture input device as claimed in claim 11, wherein the controller selectively turns on at least one of the another magnetic sensors according to another mode selection signal.

19. The gesture input device as claimed in claim 11, further comprising:

a transmission circuit, coupled to the controller and configured to communicate with an external computer device, wherein the controller generates a gesture information according to a change of the another voltage signals and provides the gesture information to the external computer device through the transmission circuit.

* * * * *